2,986,444
PRODUCTION OF LEVEL DYEINGS OF BASIC DYESTUFFS ON STRUCTURES OF ACRYLONITRILE POLYMERS

Rudolf Rokohl, Ludwigshafen (Rhine), Oppau, Bjarne Hartmark and Ernst Ploetz, Ludwigshafen (Rhine), and Dieter Wegerle, Mannheim-Feudenheim, Germany, assignors to Badische Anilin- & Soda-Fabrik Aktiengesellschaft, Ludwigshafen (Rhine), Germany No Drawing. Filed May 12, 1959, Ser. No. 812,596

Claims priority, application Germany May 14, 1958

10 Claims. (Cl. 8—84)

This invention relates to a process for the production of level dyeings of basic dyestuffs on structures which are obtainable by polymerization or copolymerization of acrylonitrile, with the aid of quaternary ammonium compounds.

Fibers of polyacrylonitrile and of acrylonitrile copolymers are being increasingly dyed with basic dyestuffs. These dyestuffs have a high affinity for the fiber; they therefore go on almost completely and yield very fast dyeings. The rapid absorption of the dyestuff due to the high affinity often leads, however, to uneven dyeings when dyeing in the temperature range of 85° C. to boiling temperature, especially from 90° to 96° C. This defect can only be remedied in some cases by careful temperature regulation (i.e. slow increase of temperature during the dyeing). A subsequent levelling of uneven dyeings, usually called levelling up, which is comparatively easy to achieve in the case of natural fibers, does not lead to the desired result with the auxiliaries hitherto usual, for example hydroxyethylation products, polymers of vinylpyrrolidone or anion-active compounds, by reason of the high affinity of the dyestuff for the said synthetic fibers.

An object of the present invention is the production of level dyeings with basic dyestuffs on acrylonitrile polymers and copolymers during the dyeing process. A further object of the invention is the production of level dyeings of the said kind by subsequent levelling up. A further object of the invention is levelling with levelling agents which do not impair the good utilization of the dyebath. A further object of the invention is levelling with stable levelling agents. A further object of the invention is levelling with levelling agents which do not impair the fastness of the dyeings.

We have found that quaternary ammonium salts having the cation of the general formula

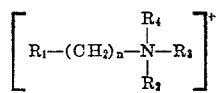

or

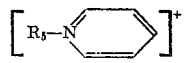

in which $R_1$ represents a cycloaliphatic radical, especially a cycloalkyl radical, having from 5 to 8 ring members or an aromatic radical, such as phenyl, diphenyl or napthyl; $n$ is an integer of from 1 to 4, inclusive, therefore $(CH_2)_n$ being a straight or branched chain alkyl radical of from 1 to 4 carbon atoms, inclusive; $R_2$ and $R_3$ each represents an aliphatic radical, especially an alkyl radical, with a maximum of 5 carbon atoms and represent a heterocyclic radical having from 5 to 7 ring members when $R_2$ and $R_3$ are taken together with the central nitrogen atom; $R_4$ represents a cycloaliphatic radical, especially a cycloalkyl radical, having from 5 to 8 ring members, or an aromatic radical such as phenyl, diphenyl or naphthyl, or a heterocyclic radical having from 5 to 7 ring members when taken together with one of the $R_2$ and $R_3$ substituents and the central nitrogen atom; and $R_5$ represents $R_1$—$(CH_2)_n$— or an aliphatic radical, preferably an alkyl radical of from 5 to 6 carbon atoms in which compound all cyclic and/or heterocyclic radicals may be substituted by alkyl radicals having from 1 to 5 carbon atoms but the total of these alkyl substituents of $R_1$ and $R_4$ being not more than 5 carbon atoms; render possible in an excellent way the production of level dyeings of basic dyestuffs on films, fibers and textiles of all kinds of acrylonitrile polymers and copolymers.

The aryl radicals $R_1$ and $R_4$ may consist of one ring or two isolated or condensed rings. They may be substituted for example by one or more saturated or unsaturated lower aliphatic radicals, particularly hydrocarbon radicals, such as alkyl radicals having for example one to three or to five carbon atoms, such as the methyl, ethyl, propyl and isopropyl radicals. For example the phenyl, diphenyl, naphthyl, toluyl, xylyl and ethylphenyl radicals are suitable as aryl radicals, $R_1$ and/or $R_4$.

Suitable cycloalkyl radicals $R_1$ and $R_4$ are for example unsubstituted or substituted hydrocarbon radicals with from 5 to 8 ring carbon atoms, such as cyclopentyl, cyclohexyl, methylcyclohexyl, ethylcyclohexyl, isopropylcyclohexyl, cycloheptyl and cyclo-octyl radicals. The radicals may also be substituted by substituents other than hydrocarbon, such as for example halogen.

The hetrocyclic rings which $R_2$ and $R_3$, or $R_2$ and $R_4$, or $R_3$ and $R_4$ can form together with the central nitrogen atom may be for example: pyrrole, pyrrolidine, methylpyrrolidine, piperidine, hexamethylene imine, morpholine. These radicals, given by way of example, are heterocyclic radicals with 5 to 7 ring members, which may be substituted by one or more lower alkyl radicals. The heterocyclic radicals may be saturated or unsaturated and may contain, besides the nitrogen atom, also other hetero atoms in the ring, for example an oxygen atom. Picoline, lutidine and collidine are examples of lower alkyl substituted pyridines.

The aliphatic radicals $R_2$ and $R_3$ may be saturated or unsaturated, linear or branched and may bear substituents, as for example hydroxyl groups. Examples are hydrocarbon radicals such as methyl, ethyl, propyl, isopropyl, butyl and amyl radicals and their derivatives containing hydroxyl groups.

$R_5$ may be a linear or branched radical which may be saturated or unsaturated, for example the hydrocarbon radicals pentyl, hexyl and their isomers.

The anions of the quaternary ammonium salts may be formed by organic or inorganic acids of medium to high strength, examples being the halogen hydracids, sulfuric acid, sulfuric acid monoesters of lower alcohols, phosphoric acid, formic acid, acetic acid or dicarboxylic acids, such as oxalic acid and tartaric acid. The organic acids may contain 1 to 4 carbon atoms in the molecule. Sulfocarboxylic acids with 1 to 4 carbon atoms may also be used.

Levelling agents of the said kind are for example benzyl-phenyl-dimethyl ammonium chloride, benzyl-cyclohexyldimethyl ammonium methosulfate, benzyl-para-methylphenyl-dimethyl ammonium chloride, benzyl-phenyl-beta-hydroxyethyl-methyl ammonium bromide, benzyl-para-methylcyclohexyl-diethyl ammonium acetate, benzyl-para-isopropyl-phenyl-dimethyl ammonium ethosulfate, benzyl-naphthyl-diethyl ammonium bromide, benzyl-pyridinium chloride, N - benzyl - N - methylpiperidinium methosulfate, benzyl-dibutyl-beta-ethoxy ammonium hydrogen sulfate, benzyl - gamma - picolinium chloride, N-benzyl-N-methyl-morpholinium chloride; benzyl-cyclo-octyl-dimethyl ammonium chloride, N-amyl-pyridinium chloride, N-amyl-symmetrical-collidinium chloride or for example the corresponding phosphates or formates. Other levelling agents for the process of this invention are for example those in which the phenyl in the benzyl radical is replaced by the other radicals specified under $R_1$.

While the principles of the structure of the levelling agents to be used in accordance with the present invention are set forth supra and while some of the levelling agents have been identified by their complete names, any one skilled in the art will of course be aware of further levelling agents which may be useful in accordance with the present invention. These are listed in the following table which gives their names in a simplified form. The table is intended for illustration and not for limitation.

ing acrylonitrile. The fibrous material may be polyacrylonitrile or an acrylonitrile copolymer. The results achieved with the levelling agents are especially favorable in the case of acrylonitrile polymers. The term acrylonitrile polymers is intended to include homopolymers of acrylonitrile and also copolymers which have been prepared from at least about 80% of acrylonitrile.

By basic dyestuffs we mean dyestuffs of the di- and tri-arylmethane series, the indolyl- and di-indolyl-arylmethane series, oxazine, thiazine, diazine, induline and cyanine dyestuffs and also the basic azo and azamethine dyestuffs.

The non-surface-active auxiliaries to be used according to this invention, in spite of their excellent levelling and levelling-up action, have a very slight retarding power so that the dyebaths are well utilized; moreover they Quaternary ammonium salts having the substituents:

| $R_1$ | $R_2$ | $R_3$ | $R_4$ | $R_5$ | $n$ |
|---|---|---|---|---|---|
| phenyl. naphthyl. diphenyl. the methyl, dimethyl, ethyl, di-ethyl, propyl, isopropyl, or butyl derivatives of the above-mentioned aryl radicals. cyclopentyl. cyclohexyl. cycloheptyl. cyclo-octyl. the methyl, ethyl, propyl, isopropyl, butyl or pentyl derivatives of the above-mentioned cycloaliphatic radicals. | methyl. ethyl. propyl. isopropyl. butyl and its isomers. pentyl and its isomers. | methyl. ethyl. propyl. isopropyl. butyl and its isomers. pentyl and its isomers. | phenyl. naphthyl. diphenyl. the methyl, dimethyl, ethyl, di-ethyl, propyl, isopropyl, butyl derivatives of the above-mentioned radicals. cyclopentyl. cyclohexyl. cycloheptyl. cyclo-octyl. the methyl, ethyl, propyl, isopropyl, butyl or pentyl derivatives of the above-mentioned cycloaliphatic radicals. | Phenyl and its isomers. hexyl and its isomers. | 1 2 3 4 |

Two of the radicals $R_2$, $R_3$ and $R_4$, when taken together with the central nitrogen atom in the abovementioned general formulae may form a heterocyclic compound such as pyrrole, pyrrolidine, piperidine, hexamethylene imine, or for example methyl, dimethyl, ethyl, di-ethyl, or propyl derivatives of the said heterocyclic compounds.

The radicals may bear additional substituents which are indifferent towards the fibers and dyestuffs under the conditions of dyeing and levelling, such as the halogen atoms chlorine or bromine or the nitrile and hydroxy groups.

The anions may be derived from halogen hydracids, such as hydrochloric acid, hydrobromic acid, from mineral acids of medium to high strength, such as sulfuric acid and phosphoric acid, from organic acids of medium to high strength, such as lower alkyl sulfuric acid monoesters, formic acid, acetic acid, oxalic acid, tartaric acid, succinic acid, or sulfo-succinic acid.

Mixtures of the levelling agents may also be used.

Many of the compounds have been known. They can all be produced by familiar methods for the production of quaternary ammonium compounds.

The levelling agents dissolve well in water. They are not surface-active and do not foam, and above all they do not impair the fastness of the dyeings.

The levelling agents may be used during the dyeing; about 0.5 to 5% is required with reference to the weight of fiber or other structure of acrylonitrile polymers. The levelling agents may also be used for levelling up after dyeing; in general larger amounts are required for this purpose, about 1.5 to 10% with reference to the weight of the fiber or other structure, in the blank dyebath. The period for the dyeing may be ½ to 8 hours, preferably the usual duration of 1 to 3 hours. Similar periods may be used for the levelling.

The levelling agents have an excellent activity in all dyeings of basic dyestuffs on textile materials such as films, fibers, flocks, fabrics and similar structures of every kind, such as yarns or knitted or woven fabrics, which have been made from polymers or copolymers containinhibit foaming and are very stable during the dyeing process. These advantageous properties could not have been foreseen.

The new process is very valuable for dyeings on acrylonitrile polymers, i.e. products which are obtainable by polymerization of acrylonitrile alone or in admixture with other polymerizable compounds and which contain at least 80%, and preferably at least 85%, by weight of acrylonitrile polymerized into the same. There are numerous commercial products in the form of foils, threads, fibers, yarns, flocks and woven and knitted fabrics which consist of such acrylonitrile polymers which are well known and need not therefore be listed here. Monomers with which acrylonitrile may be copolymerized are for example vinyl compounds, such as vinyl chloride, vinylidene chloride, vinyl bromide, vinyl acetate, vinyl propionate, vinyl pyridine, vinyl imidazole, vinyl alcohol, acrylic acid esters, methacrylic acid esters, alpha-chloracrylic acid esters, acrylamide and/or methacrylamide.

The following examples will further illustrate this invention but the invention is not restricted to these examples. Where parts are given, these are parts by weight.

Example 1

50 kilograms of machine knitting yarn of a copolymer of a major proportion of acrylonitrile and a minor proportion of vinyl acetate are dyed in skein form in a yarn dyeing apparatus (hanging system) at a liquor ratio of 60:1 with 2%, with reference to the weight of fiber, of the pure blue dyestuff of the constitution:

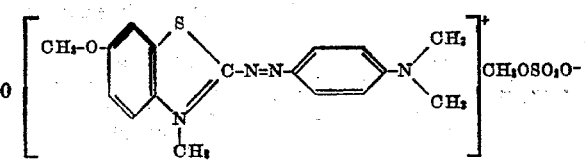

with the addition of 2 liters of 96% sulfuric acid and 10 kilograms of sodium sulfate. The temperature of the dyebath is 80° C. at the start. During 30 minutes it is raised to 90° C., the fibers scarcely being dyed. From 90° C. the bath temperature is raised by 1° C. every 15 minutes until boiling temperature is reached and then kept thereat for 3 hours. In spite of the careful temperature regulation, the dyeing thus obtained is very uneven because the dyestuff goes on spontaneously between 94° and 98° C. and cannot any longer be sufficiently levelled up by the subsequent prolonged boiling.

On the other hand, if the dyeing be carried out under otherwise identical conditions but in the presence of 2.5 kilograms of benzyl-phenyl-dimethyl ammonium chloride, an unobjectionably level dyeing is obtained. The levelling agent prevents a jerky absorption of the dyestuff and a complete exhaustion of the liquor so that the latter still contains about 10% of dyestuff when the boiling temperature is reached. After boiling for three hours, there is still a residual amount of dyestuff in the bath; this is very important for the levelling process.

If the total dyeing period is shortened by raising the temperature of the bath between 90° and 100° C. by 2° C. every 15 minutes, and the boiling is carried out for only 2 hours, similarly good dyeings are obtained when co-employing the levelling agent specified in the foregoing paragraph.

Examples of other compounds which may be used instead of benzyl-phenyl-dimethyl ammonium chloride with similar effect are benzyl-cyclohexyl-dimethyl ammonium methosulfate, benzyl-para-methylphenyl-dimethyl ammonium chloride, benzyl-phenyl-beta-hydroxyethyl-methyl ammonium bromide, benzyl-para-methylcyclohexyl-diethyl ammonium acetate.

*Example 2*

An uneven dyeing is produced on machine knitting yarn in the manner described in Example 1 and levelled up by treating the yarn in a "blank" dyebath with the addition of 2 liters of 96% sulfuric acid, 10 kilograms of Glauber's salt and 3 kilograms of benzyl-phenyl-dimethyl ammonium chloride for 4 hours at the boiling temperature. If the addition of the levelling auxiliary is omitted in this aftertreatment, the dyeing remains uneven as before. If necessary, dyestuffs may be added to the boiling aftertreatment bath for modulation.

Para-isopropylphenyl-benzyl-dimethyl ammonium ethosulfate, naphthylbenzyl-diethyl ammonium bromide or dibutyl-beta-ethoxy-benzyl ammonium chloride may be used as levelling agents with equally good effect.

*Example 3*

5 parts of acrylonitrile copolymer fabric which has been dyed with 2%, with reference to the weight of the goods, of the pure dyestuff of the formula:

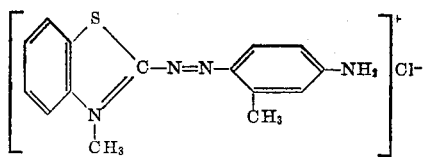

are heated together with 5 parts of undyed fabric of the same kind in a dye beaker containing as liquor 400 parts of water, 4 parts of acetic acid, 2 parts of sodium acetate and 0.4 part of benzyl pyridinium chloride for 2 hours, near the boiling temperature with occasional moving round of the material. The original dyeing is thereby completely levelled up and the white material is very clearly dyed evenly. On the other hand, without the addition of the quaternary ammonium compound, the levelling effect cannot be achieved; the dyed material scarcely changes at all and the white material is dyed only in traces.

Instead of benzyl pyridinium chloride, there may be used with very similar success the ammonium salts specified in Examples 1 and 2 or, for example, benzyl-gamma-picolinium chloride, benzyl-symmetrical-collidinium bromide, N-ethyl-N-benzyl-morpholinium acetate.

*Example 4*

In a dye beaker which contains as dye liquor 500 parts of water, 4 parts of acetic acid and 2 parts of sodium acetate, there are dyed 10 parts of acrylonitrile copolymer fabric with 0.5% (with reference to the weight of the goods) of the blue dyestuff of Example 1 and 0.5% of a red basic dyestuff of the formula:

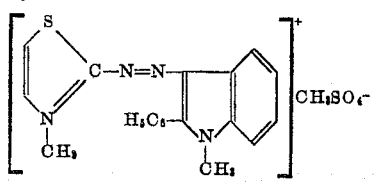

and 0.5% of a yellow basic dyestuff of the formula:

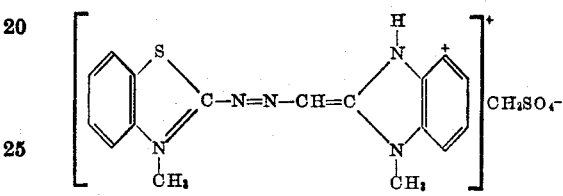

by introducing the goods into the dyebath at 60° C., rapidly raising the temperature to about 85° C., then raising the temperature within half an hour to near to the boiling temperature and carrying the process to its completion at the boil for 1 hour. A dark gray dyeing is obtained of which the evenness and through-dyeing is not without objection. By proceeding in the same way but with the addition of 0.15 part of benzyl pyridinium chloride, a dyeing is obtained in the same shade of color but having a solid, level appearance. The superior levelling effect of the auxiliary is even more clearly visible when the dyeing procedure is varied as follows. The yellow and red components are first dyed under the said conditions, but the blue component is added after cooling to about 70° C., the process then being carried to completion in the same way. When dyeing without addition of the auxiliary it is observed that the subsequently added dyestuff has gone on in a completely uneven way, whereas upon the addition of 0.15 part of benzyl-pyridinium chloride, the same level dyeing is obtained as when the three dye components are present in the bath at the same time.

If 0.15 part of dodecyl-trimethyl ammonium bromide is used instead of 0.15 part of benzyl-pyridinium chloride, it is observed that the blue dyestuff goes on only in an insignificantly small amount; a paler, strongly reddish dyeing results. The residual liquor contains the bulk of the blue dyestuff.

Although the excellent action of the levelling agents herein described could not be foreseen and although it is not possible to give a proved theoretical explanation, the following considerations may help in understanding the levelling process:

Acrylonitrile polymers evidently contain in the molecule groups which can combine with basic dyestuff molecules. Such groups are above all carboxylic or carboxylic acid amide groups. The basic dyestuffs adhere very firmly to the fiber and there result dyeings with high fastness, above all fastness to water, washing and light. The molecules of the levelling agents of the present invention are also combined with the said groups in the acrylonitrile polymers. They therefore go on to the fiber, although they are colorless, in the same way as a dyestuff. At the temperature of the dyeing, the levelling agent combined with the acrylonitrile polymer is gradually exchanged for the dyestuff. In this way a level dyeing is formed.

When the levelling agent is used for levelling up already dyed acrylonitrile polymers in blank dyebaths, an exchange similarly takes place. Levelling agent enters those places in the acrylonitrile polymer which contain an especially large amount of dyestuff, the dyestuff passes into the blank dyebath and then goes on to the acrylonitrile polymer again until a uniform distribution of the dyestuff and therefore a stable equilibrium has been achieved.

Ammonium compounds with longer alkyl radicals hitherto known as levelling agents operate according to another principle. Once they have been combined with the acrylonitrile polymer, they will not exchange with dyestuff or will only exchange to a very limited extent. Satisfactory results can hardly be obtained with these agents. Moreover when using these agents, the dyeing conditions must be very carefully observed because otherwise the acrylonitrile polymer becomes so strongly blocked by the agent that the failure of the levelling becomes clearly apparent in the dyeings. Nor does the levelling up of dyeings with the said known agents give a satisfactory result. By reason of the principle of their operation, the known agents are known as "retarders." The second paragraph of Example 4 above describes the inadequate effect of a retarder.

We claim:

1. A process for the production of level dyeings of basic dyestuffs on a textile material of an acrylonitrile polymer containing at least 80 percent by weight of acrylonitrile, which process comprises treating the polymers at any time from during dyeing until after dyeing in an aqueous bath with at least one quaternary ammonium salt having a cation selected from the group consisting of cations of the general formulae:

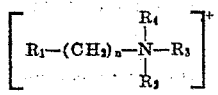

and

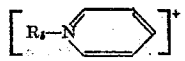

in which $R_1$ represents a cyclic radical selected from the group consisting of a cycloalkyl radical having from 5 to 8 ring members and an aromatic radical having at least one six-member ring and at the most two six-member rings;

$n$ is an integar of from 1 to 4, inclusive;

$R_2$ and $R_3$ each represents a member of the group consisting of an aliphatic radical having from 1 to 5 carbon atoms, and a heterocyclic radical having from 5 to 7 ring members when $R_2$ and $R_3$ are taken together with the central nitrogen atom in the abovementioned formula said heterocyclic radicals being selected from the group consisting of nitrogen and both nitrogen and oxygen containing heterocyclic radicals;

$R_4$ represents a member selected from the group consisting of a cycloalkyl radical having from 5 to 8 ring members, an aromatic radical having at least one six-member ring and at the most two six-member rings, and a heterocyclic radical having from 5 to 7 ring members when taken together with one of the $R_2$ and $R_3$ substituents and the central nitrogen atom in the abovementioned formula said heterocyclic radicals being selected from the group consisting of nitrogen and both nitrogen and oxygen containing heterocyclic radicals; and $R_5$ represents a member of the group consisting of $$R_1-(CH_2)_n-$$

and an aliphatic radical having from 5 to 6 carbon atoms, wherein all cyclic and heterocyclic radicals are substituted by members selected from the group consisting of hydrogen and lower alkyl having from 1 to 5 carbon atoms with the proviso that alkyl substituents in the cyclic radicals $R_1$ and $R_4$ have a total of not more than 5 carbon atoms.

2. The process as claimed in claim 1 wherein the level dyeing is carried out with a benzyl pyridinium salt.

3. The process as claimed in claim 1 wherein the level dyeing is carried out with an alkyl pyridinium salt.

4. The process as claimed in claim 1 wherein the treatment after dyeing is carried out with a benzyl pyridinium salt.

5. The process as claimed in claim 1 wherein the treatment after dyeing is carried out with an alkyl pyridinium salt.

6. A process as claimed in claim 1 wherein the quaternary ammonium salt is used in amounts of about 0.5 to 5% with reference to the weight of the fiber, during the dyeing.

7. A process as claimed in claim 1 wherein the quaternary ammonium salt is used in amounts of about 1.5 to 10% with reference to the weight of fiber during the subsequent levelling up.

8. A process as claimed in claim 1 wherein the quaternary ammonium salt is used in the temperature range from 85° C. to the boiling point of the bath.

9. A process as claimed in claim 1 wherein the quaternary ammonium salt is used in the presence of an inorganic neutral salt.

10. A process as claimed in claim 1 wherein the quaternary ammonium salt is used in the presence of sodium acetate.

References Cited in the file of this patent

UNITED STATES PATENTS 2,254,965    Kling et al. _____ Sept. 2, 1941

OTHER REFERENCES

Cohen et al.: Am. Dyestuff Reporter, vol. 47, May 19, 1958, No. 10, pp. 325–329.

Sisley et al.: Encyclopedia of Surface Active Agents, Chem. Pub. Co., 1952, pp. 100, 101, 103, 106, 107.